Nov. 26, 1963  A. B. BROERMAN  3,111,849
PNEUMATIC AMPLIFIER SAMPLING VALVE
FOR CHROMATOGRAPHIC ANALYZERS
Filed March 20, 1961  5 Sheets-Sheet 1

INVENTOR.
A.B. BROERMAN
BY Hudson & Young
ATTORNEYS

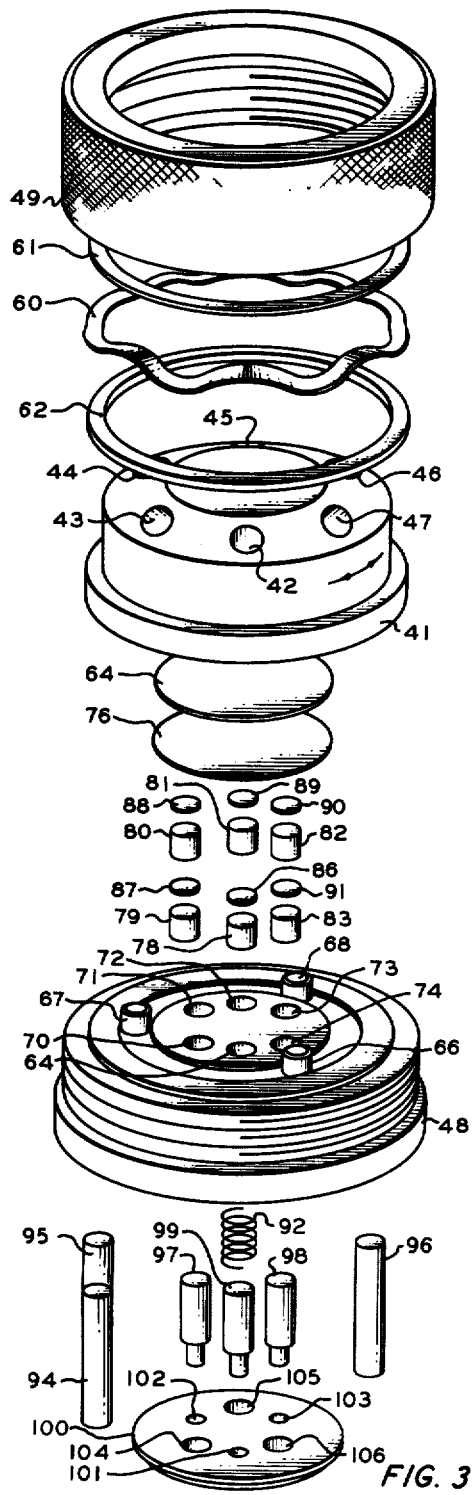
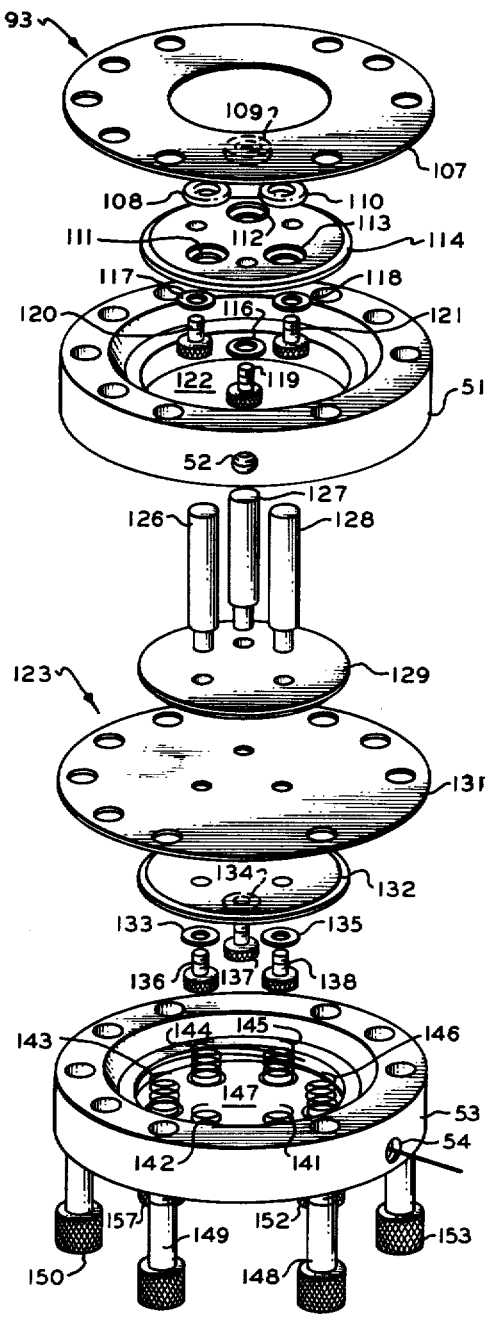
FIG. 3
FIG. 3a
INVENTOR.
A.B. BROERMAN
BY Hudson B. Young
ATTORNEYS

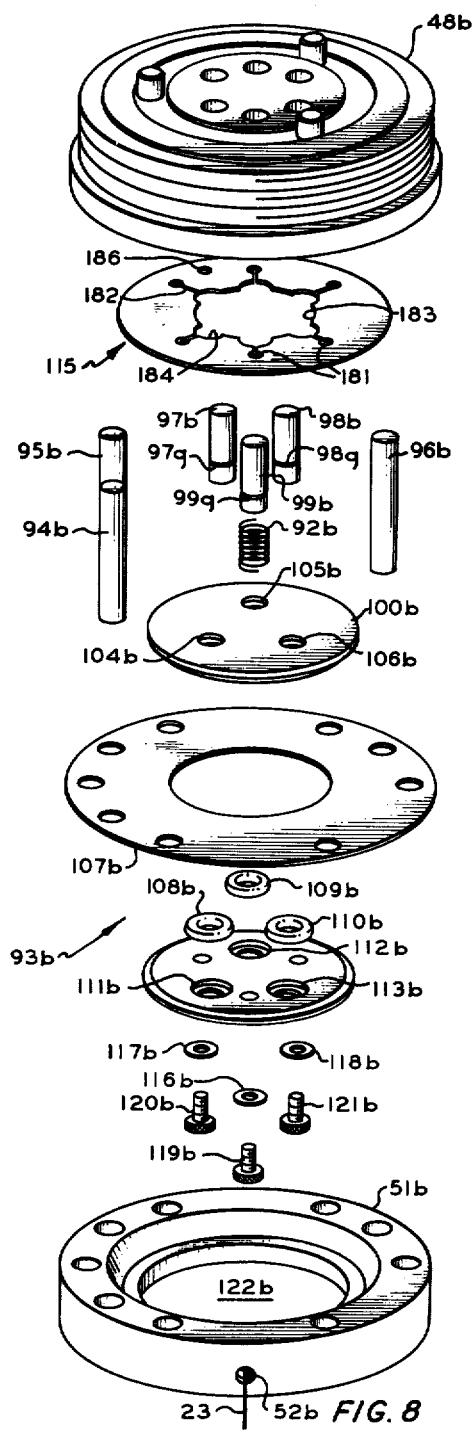
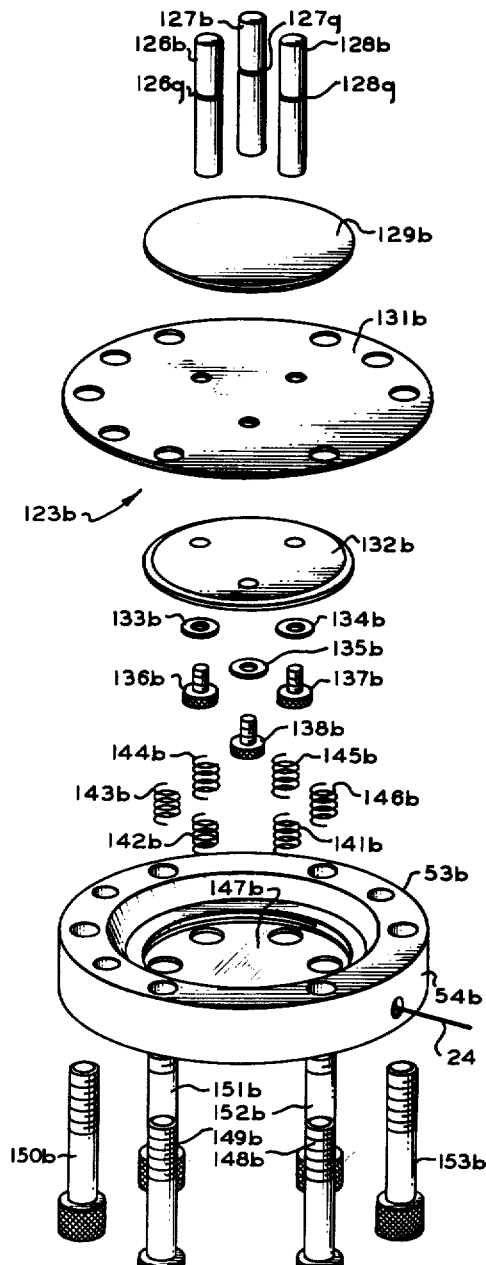
FIG. 8
FIG. 8a
INVENTOR.
A. B. BROERMAN
BY
Henderson & Young
ATTORNEYS

United States Patent Office 3,111,849
Patented Nov. 26, 1963

3,111,849
PNEUMATIC AMPLIFIER SAMPLING VALVE FOR CHROMATOGRAPHIC ANALYZERS
Arthur B. Broerman, Bartlesville, Okla., assignor to Phillips Petroleum Company, a corporation of Delaware
Filed Mar. 20, 1961, Ser. No. 96,773
9 Claims. (Cl. 73—422)

This invention relates to a multi-port, diaphragm-sealed, valve mechanism. In another aspect it relates to a fluid-actuated, multi piston-operated, sampling valve for a chromatographic analyzer having a fluid amplification element for better sealing of the diaphragm.

Gas chromatography is a known method of analyzing fluid samples by preferential sorption and desorption. The desirability of using chromatography for such specific uses as fractionation (multi-stage distillation) control has been recognized for some time. Certain features of process chromatography, such as specific measurement, high sensitivity and simplicity of operation make this type of analyzer very attractive for use in automatic process control. There are, however, some apparently inherent features of chromatography which have appeared to be obstacles in adapting chromatography to wide-spread use in process control. The first of these features is the fact that the chromatographic analysis time is long. Ordinarily, analysis time cycles range from 10 to 30 minutes, which may be acceptable for some purposes, but are often inadequate for close control of a process operation.

One problem that occurs with diaphragm-sealing sampling valves in chromatographic analysis stems from the use of the plant air-supply as the power fluid to actuate the flexible diaphragm which closes the ports of the sampling valve. Quite often the pressure of the sample stream or the carrier fluid stream approaches or exceeds that of the available plant air, often resulting in poor sealing of the diaphragm, with consequent leaks and by-passes. This, in turn, causes intolerable inaccuracies in analysis, particularly where sample slugs of micro-liter size are being analyzed. The net result in plant applications of gas chromatography has been a serious limitation on the utility of diaphragm-sealed sampling valves.

The present invention involves first applying the plant air supply having limited pressure against a power diaphragm of a relatively large area, which diaphragm transmits the pressure to a plurality of pistons of relatively small total area, which pistons seal the adjacent areas of the sealing diaphragm over the valve ports. In this manner, a factor of pneumatic amplification of the plant air pressure is created. For example, the particular embodiment to be described in detail later has an amplification factor of 17 to 1. Thus, a plant air supply of 10 p.s.i. can be effectively increased to a pressure of about 170 p.s.i. exerted by each of the pistons against the sealing diaphragm. This is accomplished by first directing the power fluid to at least one separate chamber enclosed by a power plate. The other of said plates is provided with recesses to accommodate one end of a plurality of pistons. The other ends of the pistons are in close proximity to the flexible sealing diaphragm itself, and in sealing contact therewith when actuated by the power diaphragm. When the pneumatic pressure on spring biased power diaphragm is released, the positive pressure of the carrier fluid re-establishes flow between adjacent ports, as directed. This invention overcomes the leaking and bypassing by insuring a strong mechanical seal when particular ports are in the closed position, as desired.

It is, therefore, an object of this invention to provide a sampling valve for use in a chromatographic analyzer system, whereby leaks and bypassing can be substantially avoided.

It is another object to provide a fluid-actuated, pneumatically amplified diaphragm sealing sampling valve for supplying sample slugs to the columns of a chromatographic analyzer.

It is still another object to provide a sampling valve which employs pneumatic amplification of the power gas pressure to effectively seal a flexible diaphragm actuated valve.

Other objects, advantages and features of this invention should become apparent from the following detailed description, taken in conjunction with the accompanying drawing in which:

FIGURES 3 and 3a are exploded perspective views of the components of the diaphragm valve of this invention arranged in the order of their assembly;

FIGURES 8 and 8a are exploded perspective views of the part of the components of the third embodiment of this invention arranged in the order of their assembly.

Figure 1:
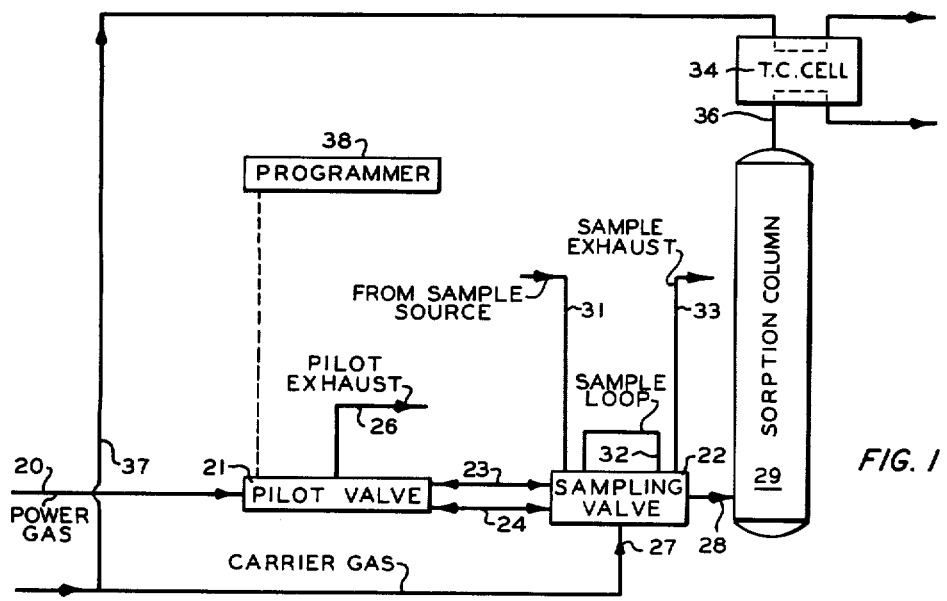
FIGURE 1 is a schematic flow diagram of a chromatographic analyzer system embodying the sampling valve of this invention.

Reference is now made to the drawing in detail, wherein like parts have been designated by like reference numerals, and to FIGURE 1 in particular, wherein a power gas, such as air, passes via conduit 20 to pilot valve 21, wherein the power gas stream is directed to a first side of a pneumatically-actuated, diaphragm-sealed sampling valve 22 via conduit 23. Meanwhile, the second side of sampling valve 22 is being vented via conduit 24, pilot valve 21, and pilot exhaust conduit 26. A carrier gas, such as helium or hydrogen, is passed via conduit 27, sampling valve 22, and conduit 28 to column 29. A gaseous sample from the process stream, introduced to sampling valve 22 via conduit 31, is being circulated through sample loop 32 of sampling valve 22 and vented therefrom via sample exhaust conduit 33. Periodically, the sample in loop 32 is passed along with the carrier gas, via conduit 28, to sorption column 29, where constituents of the sample to be identified and measured, are absorbed or adsorbed, depending upon the nature of the contact material, and then are selectively desorbed by a continuing flow of carrier gas therethrough.

The effluent from the sorption column 29 passes through an analyzer, indicated as thermal conductivity assembly 34, via conduit 36. The output signal from the detector 34 is passed to a recording instrument (not shown), which can be a conventional strip chart recorder. A stream of carrier gas is passed via conduit 37 from conduit 27 directly to the reference cell of detector 34, so as to balance out the effect of the carrier gas in the column 29 effluent. The sample gas to be analyzed generally enters the system continuously through conduit 31. It is exhausted through conduit 33, even when a slug thereof is selected for analysis. Pilot valve 21 is actuated by programmer 38, which can be operated by a time cycle or other means. For a detailed discussion of the design and manner of operation of a typical pilot valve which can be used in conjunction with this invention, see the copending application of Emmerich Guenther, Serial No. 858,997, filed December 11, 1959.

When pilot valve 21 is changed from the first described position, power gas is now directed to the second side of sampling valve 22 via conduit 24. Carrier gas now passes to sample loop 32, collecting the sample trapped therein, and carrying the same to sorption column 29, via conduit 28. Meanwhile, the first side of sampling valve 22 is vented via conduit 23, pilot valve 21 and pilot valve exhaust conduit 26. Thus, each time pilot valve 21 is switched to the alternate position of operation, a measured sample is passed via conduit 28 to column 29 for sorption and desorption therein.

Figure 2:
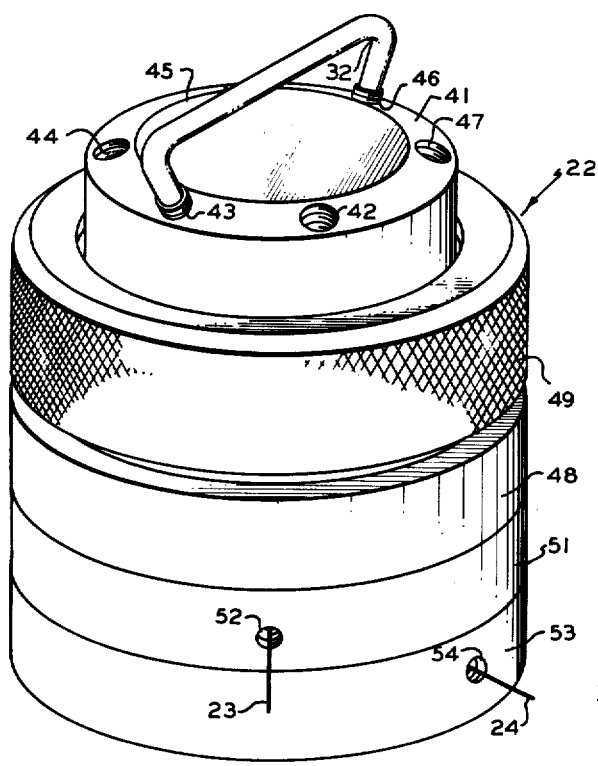
FIGURE 2 is a perspective view of an assembled, fluid-actuated, diaphragm-sealed valve of this invention.

In FIGURE 2, there is shown a perspective view of the assembled fluid-actuated flexible diaphragm sampling valve of this invention, generally designated 22. Sampling valve 22 comprises an upper body 41 provided with six threaded inclined passages 42 to 47, which communicate with the lower surface of upper block 41 by diverging passages (not shown). Sample loop 32 communicates between passages 43 and 46. Adjacent to the upper block is intermediate block 48 provided with a plurality of cylindrical passages (not shown) communicating between the upper and lower faces thereof. A metal locking ring 49 is threadedly secured to intermediate block 48, and is spaced therefrom by the concealed shoulders of upper block 41, and a pair of sealing gaskets (not shown).

Disposed adjacent to block 48 is a power diaphragm ring 51, provided with a threaded passage 52 communicating with an internal chamber (not shown) defined by ring 41 and block 48. Disposed adjacent and below ring 51 is a second power diaphragm cap 53, which is closed at its lower end, forming the base of valve 22. Cap 53 is provided with a threaded passage 54 communicating with a second chamber (not shown) within cap 53.

Referring now to FIGURE 3, showing the exploded view of the sampling valve, a crimped spring washer 60 and a pair of washers 61 and 62 are disposed between assembly ring 49 and upper block 41. Crimped washer 60 has a plurality of waves and is composed of spring steel. Washers 61 and 62 are preferably composed of a thermosetting plastic which is chemically inert and heat resistant, such as Kel–F (a polymer of chlorotrifluoroethylene). Washers 60—62 seat on shoulder 63 of upper body 41 beneath locking ring 49, and are designed to maintain a gas-tight seal between bodies 41 and 48. The use of a crimped washer allows for better sealing by adjusting with the cold flow of the plastic sealing diaphragm.

A flexible, sealing diaphragm 64, of a diameter suited to seat within lugs 66 to 68 of intermediate body 48 and also completely cover the passages 69 to 74 therein is disposed above body 48. Sealing diaphragm 64 is preferably composed of a thermosetting plastic which is chemically inert and heat resistant, such as Teflon (a polymer of tetrafluoroethylene).

Disposed between diaphragm 64 and body 48 is a paper cushion 76. Cushion 76 is suitably a 2 mil thick linen rag drafting paper, or a matted glass fiber paper, depending on temperature service encountered. It serves to prevent the Teflon sealing diaphragm from cold flowing, and also furnishes support for it to prevent ballooning under alternating carrier and power gas pressure.

A set of metal plungers, 78 to 83, are located within passages 69 to 74, respectively, when valve 22 is assembled. These plungers transmit a sealing pressure against the adjacent areas of cushion 76 and sealing diaphragm 64, as directed. Plunger pads 86 to 91, preferably composed of silicone rubber or Viton "A," a copolymer of hexafluoropropylene and vinylidene fluoride, marketed by Du Pont Co. help to correct for any slight non-parallelism of the plunger tops with the cushion 76.

A single coil spring 92 is disposed below body 48 and adapted to fit into a recess (not shown) in the lower face thereof. Spring 92 biases upper power diaphragm assembly 93 downward. Dowel pins 94, 95 and 96 are provided for orienting assembly 93 in the proper position relative to body 48.

Upper power diaphragm assembly 93 comprises: a set of three short piston rods 97, 98 and 99; first power diaphragm back-up plate 100, composed of metal, provided with small passages 101, 102 and 103, to accommodate the shouldered and internally threaded lower ends of rods 97 to 99 and large diameter passages 104, 105 and 106; first power diaphragm 107, preferably composed of a rubber-coated fabric, such as Fairprene marketed by the Du Pont Co.; also, Cohrlastic, silicone rubber-coated fabrics marketed by the Connecticut Hard Rubber Co., may be employed. O-rings 108, 109 and 110, which seat within the shouldered passages 111, 112 and 113 are provided in second power diaphragm back-up plate 114; washers 116, 117 and 118 are provided with machine screws 119, 120 and 121, that secure power diaphragm assembly 93 together.

Power diaphragm ring 51 is provided with chamber 122, from which power gas entering through passage 52 exerts a pressure upwardly on upper assembly 93, and simultaneously on the lower power diaphragm assembly, generally designated 123. Assembly 123 comprises: a second set of three long piston rods 126, 127 and 128; a third power diaphragm back-up plate 129; a second power diaphragm 131, also preferably composed of rubber-coated fabric; a fourth power diaphragm back-up plate 132; washers 133, 134 and 135 provided with machine screws 136, 137 and 138, that secure the second power diaphragm assembly 123 together.

A set of six springs, 141 to 146, having an overall tension greater than spring 92, are disposed between assembly 123 and valve base 53, which is provided with a chamber 147. Springs 141 to 146 bias assembly 123 upward. In an alternate embodiment, a single spring (not shown) may be centrally disposed within chamber 147 through the bottom of base 53, with an adjustable screw (not shown). Allen headed, cap screws 148 to 151 secure the entire assembled valve 22 together.

In all of these embodiments, the diaphragm valve has an inherent "fail-safe" feature. In the event of power gas failure (usually plant air supply), sample fluid and carrier gas flow through the sampling valve would be in the "off" position. Thus they would not intermix, and the sample fluid could not ruin the sorption columns by flowing thereto and flushing out the liquid partition fluid.

Figure 4:
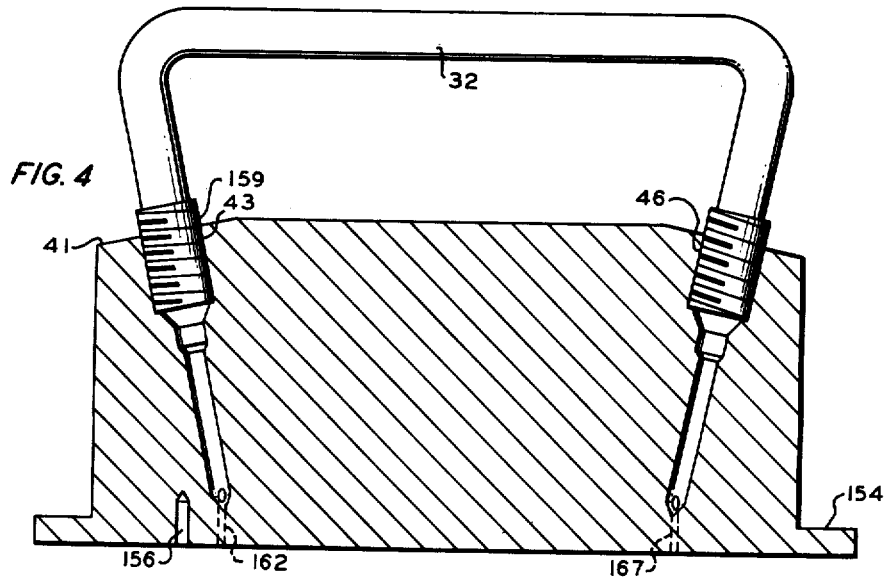
FIGURE 4 is a full sectional view of the upper member of the valve of this invention.

In FIGURE 4, upper block 41 is shown in full section. Inclined threaded passages 43 and 46 are in communication via sample loop 32 of said block, and juncture points just above the lower surface 154 of block 41. Passages 43 and 46 then fork into diverging channels which communicate with lower surface 154. Lower surface 154 is provided with a recess 156 adapted to receive therein lug 67 of lower block 48. Sample loop 32 is secured to passages 43 and 46 via filter fittings, such as 159, which are threadedly secured therein.

Figure 5:
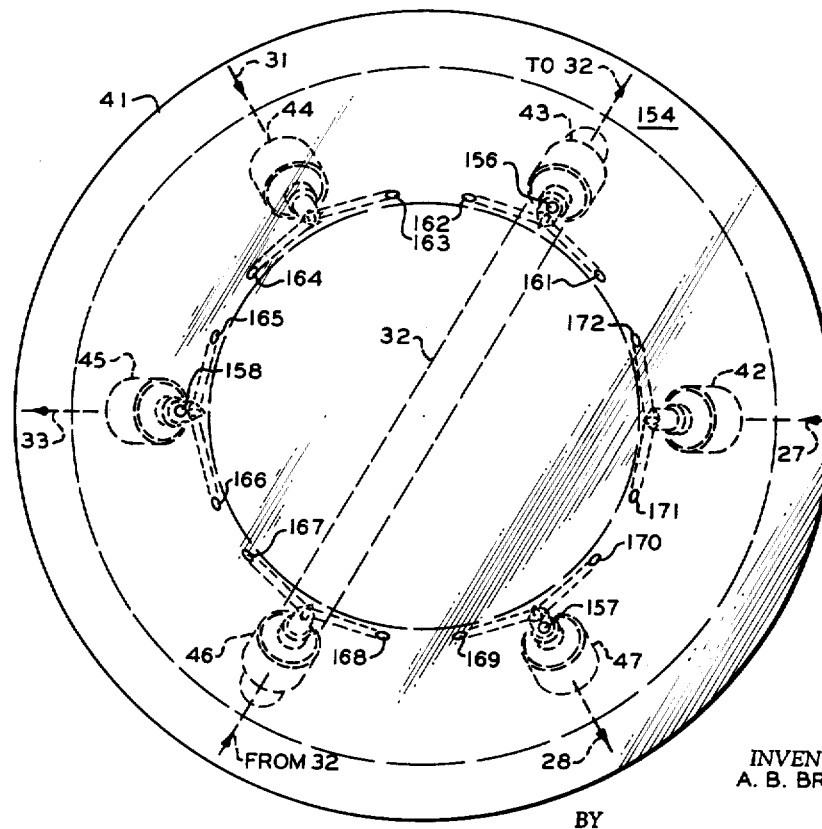
FIGURE 5 is a bottom plan view of the upper valve valve member.

In FIGURE 5 is shown a bottom view of upper block 41, with lug recesses 156, 157 and 158 clearly seen therein. The terminals 161 to 172 of inclined passages 42 to 47 can be seen in lower face 154 of upper block 41.

Figure 6:
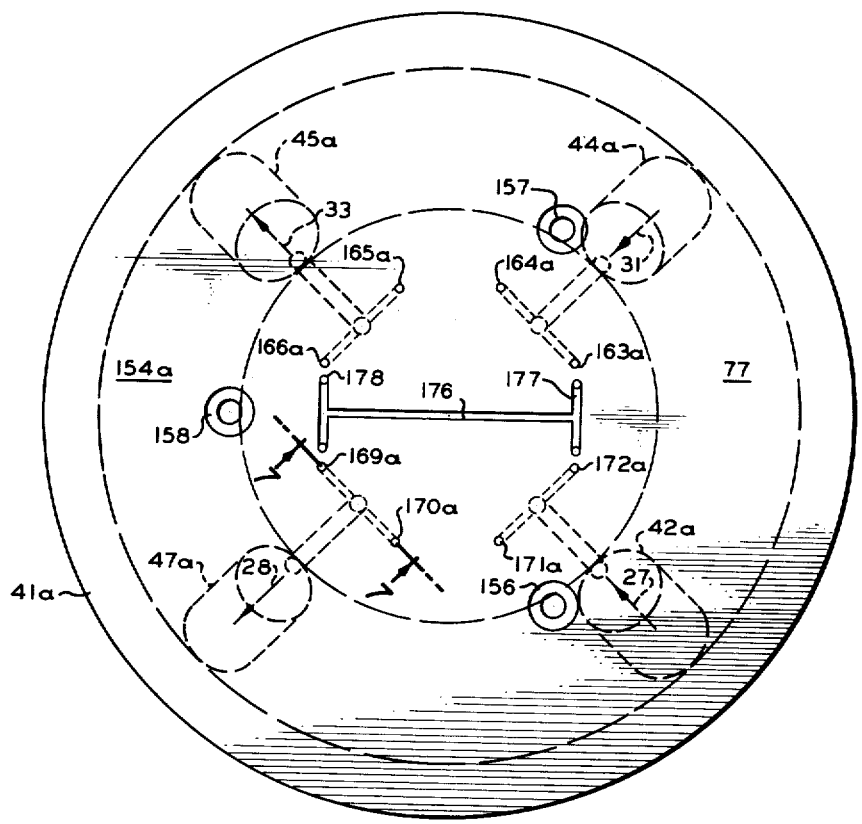
FIGURE 6 is a bottom plan view of the upper member of the valve of the second embodiment of the invention.

Referring now to FIGURE 6, there is shown a bottom view of an alternate design of upper block, designated 41a. All the other elements of sampling valve 22 are of identical design and function, with the exception of external sample loop 32 which is omitted. Block 41a has been modified to provide sample slugs of micro-liter sized volume to sorption column 29. Thus upper body 41a need only be provided with four threaded inclined passages 42a, 44a, 45a and 47a, all of which communicate with the lower surface 154a of upper block 41. The terminals, or ports, 161a–172a, of the inclined passages 42a, 44a, 45a and 47a, and an internal sample loop 176 can be seen in lower face 154a. Internal sample loop 176 comprises a rectangular groove in face 154a which is a variable cross-section and a length terminating on the circle described by ports 161a and 172a. In one embodiment groove 176 has a square cross-section 0.007″ x 0.007″, yielding a sample loop volume of 0.3 micro-liters. It is obvious, other dimensions and sample loop volumes can be achieved, as desired. Each end of groove 176 bisects a similar groove 177 and 178, perpendicular thereto. Grooves 177 and 178 have a length equal to the distance between adjacent pairs of the ports of said diverging passages.

Figure 7:
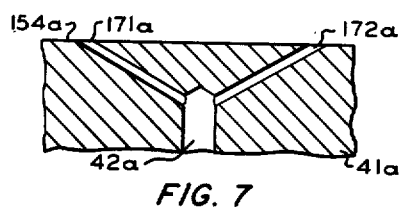
FIGURE 7 is a detailed broken out view taken along lines 7—7 in FIGURE 6.

In FIGURE 7 is shown a detailed sectional view of how the inclined passages, such as 42a, fork at a juncture point short of lower face 154a, to permit fluid flow through either port 171a or 172a to the next adjacent port in body 41a, depending upon the position of sealing diaphragm 64 of FIGURE 3.

In operation, when power gas flows to sampling valve 22 from pilot valve 21, via conduit 23, and passage 52, it enters chamber 122 within ring 51 of valve 22. The power gas exerts pressure on upper power diaphragm assembly 93, raising the same including attached piston rods 97 to 99, also first compression spring 92, lifting adjacent plungers 78, 80 and 82 to pressure adjacent portions of sealing diaphragm 64. Thus, the portions of diaphragm 64 adjacent to said three plungers, seal against the lower face 154 of upper block 41, first closing off ports 172 and 161 leading from inclined passages 42 and 43, respectively; ports 164 and 165 leading from inclined passages 44 and 45, respectively; and ports 168 and 169 leading from inclined passages 46 and 47, respectively. Next, the power gas pressure in chamber 122 overcomes the stronger set of springs 141–146, lowering the lower power diaphragm assembly 123, including attached piston rods 126, 127 and 128, to release the sealing pressure on plungers 79, 81 and 83 against sealing diaphragm 64. Thus, communication is reestablished between ports 162 and 163 leading from inclined passages 43 and 44, respectively; between ports 166 and 167 leading from inclined passages 45 and 46, respectively; and between ports 170 and 171 leading from inclined passages 47 and 42, respectively. This sequence is characterized as a "make before break" mode of operation, which prevents leakage of fluids from one path of flow to the alternate path, as the paths of flow are being alternated.

Now, carrier gas in conduit 27, under greater than atmospheric pressure, enters sampling valve 22 via inclined passage 42 which diverges into two passages before reaching lower surface 154 of block 41, but because the diverging passage to the air space normally above plunger 78 between lower face 154 and sealing diaphragm 64 is temporarily closed by plunger 78, the carrier gas may flow 50 from port 171 only under the portion of diaphragm 64 adjacent retracted plunger 83, via port 170, to the inclined passage 47, and out of valve 22 via conduit 28 to sorption column 29.

Concurrently, sample fluid from sample source conduit 31 enters sampling valve 22 through inclined passage 44. Again, because the one diverging passage to the air space normally above plunger 80 between face 154 and sealing diaphragm 62 is temporarily closed by pressured plunger 80, the sample fluid passes only through the other fork of passage 44 via port 163, through the air space adjacent retracted plunger 79, via port 162 to inclined passage 43 to external sample loop 32. Sample liquid returns from loop 32 via passage 46, port 167, passes through the air space adjacent retracted plunger 81, via port 166, to inclined passage 45 and out of valve 22 via sample exhaust conduit 33 to discharge.

When pilot valve 21 switches to its alternate position, as directed by programmer 38, power gas from pilot valve 21 now passes through conduit 24 via passage 54, to chamber 147 within cap 53 of valve 22.

Simultaneously, power gas is exhausted from chamber 122 via conduit 23, and the stronger set of springs 141 to 146 will effect a temporary upward lift of lower power diaphragm assembly 123, resulting in pressure on the adjacent portions of sealing diaphragm 64. Subsequently, weaker single spring 92 will bias upper assembly 93 downward, re-establishing communication between ports 172 and 161 leading from inclined passages 42 and 43, respectively; between ports 164 and 165 leading from inclined passages 44 and 45, respectively; and between ports 168 and 169 leading from inclined passages 46 and 47, respectively. This also is a "make before break" mode of operation, preventing fluid leakage during the switching of paths of flow.

The power gas to chamber 147 also exerts pressure on lower power diaphragm assembly 123, holding the same raised, including attached piston rods 126 to 128 thereof lifting adjacent plungers 79, 81 and 83 to pressure adjacent portions of sealing diaphragm 64. Thus, these adjacent portions of diaphragm 64 remain sealed against lower face 154 of upper block 41, closing off ports 162 and 163 leading from inclined passages 43 and 44, respectively; ports 166 and 167 leading from inclined passages 45 and 46, respectively; and ports 170 and 171 leading from inclined passages 47 and 42, respectively.

Carrier gas in conduit 27, under greater than atmospheric pressure, still enters valve 22 via inclined passage 42, which diverges into two passages before reaching lower surface 154. Now because the diverging passage to the air space normally above plunger 83, between lower face 154 and sealing diaphragm 64, is temporarily closed by plunger 83, the carrier gas may flow from port 172 only under the portion of diaphragm 64 adjacent retracted plunger 78, via port 161 to the inclined passage 43, to sample loop 32. Fluid in sample loop 32 re-enters valve 22 via passage 46, passing through one fork thereof, from port 168, through space above retracted plunger 82, via port 169, to inclined passage 47, and out of valve 22, via conduit 28 to sorption column 29, driving a slug of fluid sample trapped in sample loop 32 before it. Meanwhile, sample fluid in conduit 31 continues to enter valve 22 via passage 44, now passing from port 164, the space normally above retracted plnger 80, via port 165 to inclined passage 45, and out of valve 22 via exhaust conduit 33 to vent.

When pilot valve 21 once more switches back to the first position, the paths of flow of carrier and sample fluid through valve 22 will revert to that first described. Specifically, sample fluid is flowing continuously through sample loop 32, while carrier gas is being sent directly to column 29, by-passing sample loop 32. This condition will exist until it is desired to pass another sample slug to column 29. The frequency with which the sample slug is passed to the sorption column is determined by the frequency of switching of pilot valve 21, controlled through programmer 38.

In operation, the second embodiment of valve 22, shown in FIGURE 6, performs almost identically to that of the first embodiment. The sole difference is that the sample flows through internal sample loop 176 in the second embodiment, instead of through external sample loop 32 of the first embodiment. Thus, when pilot valve 21 switches to its alternate position, a sample slug of much smaller volume passes from sampling valve 22 through conduit 28 to column 29.

Referring now to FIGURES 8 and 8a, there is shown exploded views of a portion of the third embodiment of the sampling valve of this invention, directed to an alternate design for the intermediate block, designated 48b, and for power diaphragm assemblies 93b and 123b. This embodiment permits the sampling valve to be operated on a periodic single air signal to chamber 122b, whenever apparatus for supplying an air signal alternatively to chamber 122b and 147b is not available.

It will first be noted that the separate set of metal plungers and pads are dispensed with in this embodiment, being compensated for by extending the length of the two sets of piston rods 97b to 99b, and 126b to 128b, equal to the length lost by the omission of the metal plungers 78 to 83 of FIGURE 3.

A special flat spring 115, machined from a spring steel stock, is disposed below body 48b, and adapted to fit into a pancake-shaped recess (not shown) in the lower face thereof. A single coil spring 92b is also disposed below body 48b, and adapted to pass through the hollow center of spring 115, into a second central recess (not shown) in the lower face of body 48b. Spring 92b biases upper power diaphragm assembly 93b downward, while new spring 115 biases all the attached piston rods downward when they are not being forced to seal by either of the power diaphragms.

Upper power diaphragm assembly 93b comprises: a set of three short piston rods 97b, 98b and 99b; a first power diaphragm back-up plate 100b, composed of metal, provided with passages 104b, 105b and 106b of a diameter sufficient to permit said rods to slidably pass therethrough; a first power diaphragm 107b, preferably composed of a rubber-coated fabric; O-rings 108b, 109b and 110b which seat within the shouldered passages 111b, 112b, and 113b and are provided in second power diaphragm back-up plate 114b; washers 116b, 117b and 118b are provided with Allen screws 119b, 120b and 121b, that secure the two back-up plates together.

In this embodiment, piston rods 97b to 99b are flat on their lower ends, thus freely contacting the surface of upper back-up plate 100b, but not fastened to the same, in order that the plate may wobble to compensate for slight differences in the length of rods 97b to 99b. The rods are further provided with peripheral grooves 97g to 99g, respectively, into which fit the inner lobes such as 183 of spring 115.

Power diaphragm ring 51b is provided with chamber 122b, from which power gas entering through passage 52b exerts a pressure upwardly on upper assembly 93b, and simultaneously on lower power diaphragm assembly, generally designated 123b. Assembly 123b comprises: a second set of three long piston rods 126b, 127b, and 128b; a third power diaphragm back-up plate 129b; a second power diaphragm 131b, also preferably composed of rubber-coated fabric; a fourth power diaphragm back-up plate 132b; washers 133b, 134b and 135b provided with Allen screws 136b, 137b and 138b, that secure the two back-up plates together. Here also rods 126b to 128b contact, but are not fastened to, back-up plate 129b. They are also provided with grooves 126g to 128g.

It will be noted that special flat spring 115 has six holes, such as 181, and six slots, such as 182, which form the truncated, pie-shaped leaves, or lobes, such as 183, that seat into the grooves on the periphery of piston rods 97b to 99b and 126b to 128b. Hemispherically-shaped cutouts, such as 184, are provided at the inner ends of slots 182, while smaller diameter holes, such as 186, are located about the periphery for alignment purposes. These features give each of the lobes the necessary flexibility to flex with the great many cycles of operations of the piston rods. Spring 115 is preferably made from tempered clock spring steel stock of 0.010 inch thickness.

In operation, the third embodiment of valve 22, shown in FIGURES 8 and 8a, performs almost identically to that of the first embodiment. The sole difference is that when the power gas flows to sampling valve 22, via conducit 23, the path of flow of carrier gas and sample fluid through the valve remains as described in connection with FIGURE 6. However, when pilot valve 21 switches to its alternate position, as directed by programmer 38, no power gas passes through to chamber 147b. Thus, the springs 141b to 146b in chamber 147b alone effect a temporary upward lift of lower power diaphragm assembly 123a, resulting in pressure on the adjacent portions of sealing diaphragms 64b, while single spring 92b will bias upper assembly 93b downward, re-establishing communication between the alternate pairs of ports.

Various modificatons and alterations of this invention will become apparent to those skilled in the art without departing from the scope and spirit of the invention, and it should be understood that the latter is not necessarily limited to the aforementioned discussion.

What is claimed is:

1. A fluid-motor actuated valve system for distributing a first fluid to a selected conduit comprising, in combination: a first body having two opposite faces; first, second and third spaced passages in said body, each of said spaced passages communicating between the first of said faces and a separate point intermediate the faces thereof, each of said spaced passages there forking into two diverging passages terminating in the second of said faces so that said first spaced passage communicates with the first and second of said diverging passages, said second spaced passage communicates with the third and fourth of said diverging passages, and said third spaced passage communicates with the fifth and sixth of said diverging passages; a second body having a third face spaced from the second face of said first body; a first flexible sealing diaphragm disposed within the area defined by said third face and thereby protected from compression; first and second cylindrical passages traversing said second body; first and second plungers slidably disposed in said first and second cylindrical passages, respectively; said first and second plungers adjacent said diaphragm and opposite the ports of said first, third, fourth and fifth of said diverging passages, respectively, a third body disposed adjacent said second body; a first spaced chamber disposed in said third body; said first chamber defined at its ends by first and second power diaphragm assemblies; a fourth body disposed adjacent said third body; a second spaced chamber disposed in said fourth body; said second chamber defined at its upper end by said second diaphragm assembly and at its lower end by the closed end of said fourth body; means to secure said first, second, third and fourth bodies, relative to one another, in a fixed relationship; a first conduit means connected to supply said first fluid to be distributed under a first pressure to said second spaced passage; a second conduit means connected to receive said first fluid from said first spaced passage; a third conduit means connected to receive said first fluid from said third spaced passage; a fourth conduit means connected to supply, during a first time interval, a second fluid under a second pressure greater than said first pressure to said first chamber to exert upward pressure on said first diaphragm assembly, a first piston rod secured on the upper side of said first assembly adapted to pass through said first cylindrical passage in said second body pressuring said first plunger to force a first portion of said sealing diaphragm thereunder to seal between the ports of said third and second diverging passages of said first body, whereby first fluid enters said valve system through said second passage and passes out of said system through said third passage; a fifth conduit means to vent said first chamber, during a second time interval, whereupon said first fluid pressure will establish communication between said third and second diverging passages under said diaphragm; a sixth conduit means to supply, during said second time interval, a third fluid under a third pressure greater than said first pressure to said second chamber to exert upward pressure on said second diaphragm assembly; a second piston rod secured on the upper side of said second assembly adapted to pass through said first chamber, a vertical passage in said first diaphragm assembly, and said second cylindrical passage in said second body pressuring said second plunger to force a second portion of said sealing diaphragm thereunder to seal between the ports of said fourth and fifth diverging passages, whereby said first fluid enters said system through said second spaced passage and passes out of said system through said first passage; and a seventh conduit means to vent said second chamber, during said first time interval, whereupon said fluid pressure will establish communication between said fourth and fifth diverging passages under said diaphragm.

2. The apparatus according to claim 1 wherein said first fluid is helium.

3. The apparatus according to claim 1 wherein said second and third fluids are air.

4. A two position, fluid actuated, diaphragm-sealed sampling valve, comprising, in combination: a first body provided with a set of first, second, third and fourth spaced passages, each of said spaced passages communicating between a region external of said first body and a separate juncture point intermediate the lower surface thereof, each of said spaced passages there forking into two diverging passages communicating between said juncture points and said lower surface, so that said first spaced passage communicates with the first and second of said diverging passages, said second spaced passage communicates with the third and fourth of said diverging passages, said third spaced passage communicates with the fifth and sixth of said diverging passages, said fourth spaced passage communicates with the seventh and eighth of said diverging passages; a first groove disposed in the lower surface of said first body to serve as an internal sample loop; a second groove in said lower surface bisected by one end of said first groove, said second groove having a length equal to the distance between adjacent pairs of the ports of said diverging passages; a third groove in said lower surface bisected by the other end of said first groove, said third groove having a length comparable to said second groove; said lower face further provided with a plurality of recesses located outside the circle described by the ports of said diverging passage adapted to receive therein a plurality of lugs affixed to an adjacent second body, said second body spaced from said first body by a thin flexible sealing diaphragm of a diameter suited to fit within said lugs; a set of six cylindrical passages traversing said second body; a set of six plungers disposed in said first to sixth cylindrical passages, respectively, adjacent said diaphragm and opposite the ports of said diverging passages so that said first plunger is opposite the ports of said first of said diverging passages, and one end of said second passage, said second plunger is opposite the ports of said second and third of said diverging passages, said third plunger is opposite the port of said fourth diverging passage and one end of said third passage; said fourth plunger is opposite said fifth diverging passage and the other end of said third passage, said fifth plunger is opposite the ports of said sixth and seventh of said diverging passages, and said sixth plunger is opposite the eighth of said diverging passages and the other end of said second passage; a third body disposed adjacent said second body, a first spaced chamber disposed in said third body and defined at its ends by first and second power diaphragm assemblies; a fourth body disposed adjacent said third body; a second chamber disposed in said fourth body and being defined at its upper end by said second power diaphragm assembly; and at its lower end by the closed end of said fourth body; said third body having a first passage adapted to admit a power gas to said first chamber; said fourth body having a second passage adapted to admit said power gas to said second chamber; means to secure said first, second, third and fourth bodies, relative to one another, in a fixed relationship; first and second sets of three piston rods each secured to the upper surfaces of said first and second power diaphragm assemblies, respectively; each of said sets of piston rods moving upward when its respective diaphragm assembly is raised; thereby raising the adjacent plungers and sealing the adjacent portions of said sealing diaphragm against the lower surface of said first body, thereby closing off communication between certain of the adjacent external ports of said diverging channels, as desired; the first of said four spaced passages adapted to receive a flowing carrier gas; the second of said spaced passages adapted to receive a flowing sample fluid; the third of said spaced passages adapted to vent said sample fluid; and the fourth of said spaced passages for conducting carrier gas and sample fluid, as desired, from said sampling valve, said valve adapted to admit power gas to said first chamber, during a first interval of time, moving upward said first diaphragm assembly and its related pistons and plungers, whereby carrier gas enters said valve through said first spaced passage and exits through said fourth spaced passage while said sample fluid enters said valve, passes thru said sample loop, and is vented; said valve adapted to vent power gas from said first chamber, during a second interval of time; said valve adapted to admit power gas to said second chamber, during said second interval of time moving upward said second diaphragm assembly and its related pistons and plungers, whereby carrier gas enters said valve, passes thru said sample loop driving before it a slug of sample fluid trapped therein, out of said valve while said sample fluid enters said second spaced passage and directly exits said third spaced passage.

5. A two-position, fluid-actuated diaphragm valve sampling system comprising, in combination: a first body provided with a set of first, second, third, fourth, fifth and sixth spaced passages, each of said spaced passages communicating between a region external of said first body and a separate point intermediate the lower surface thereof, each of said passages there forking into two diverging passages communicating between said juncture points and said lower surface, so that said first spaced passage communicates with the first and second of said diverging passages, said second spaced passage communicates with the third and fourth of said diverging passages, said third spaced passage communicates with the fifth and sixth of said diverging passages, said fourth spaced passage communicates with the seventh and eighth of said diverging passages, said fifth spaced passage communicates with the ninth and tenth of said diverging passages, and said sixth spaced passage communicates with the eleventh and twelfth of said diverging passages, said lower surface further provided with a plurality of recesses located outside the circle described by the ports of said diverging passages adapted to receive therein a plurality of lugs affixed to an adjacent second body; said second body spaced from said first body by a flexible sealing diaphragm of a diameter suited to fit within said lugs; a set of six cylindrical passages traversing said second body; a set of six plungers disposed in said first to sixth cylindrical passages, respectively, adjacent said diaphragm and opposite the ports of said diverging passages so that said first plunger is opposite the ports of said first of said diverging passages, and one end of said second passage, said second plunger is opposite the ports of said second and third of said diverging passages, said third plunger is opposite the port of said fourth diverging passage and one end of said third passage; said fourth plunger is opposite said fifth diverging passage and the other end of said third passage; said fifth plunger is opposite the ports of said sixth and seventh of said diverging passage, and said sixth plunger is opposite the eighth of said diverging passages and the other end of said second passage; a third body disposed adjacent said second body; first spaced chambers within said third body and defined at its ends by first and second power diaphragm assemblies, a fourth body disposed adjacent said third body; second spaced chamber within said fourth body and defined at its upper end by said second power diaphragm assembly and at its lower end by the closed end of said fourth body, means to secure said first, second, third and fourth bodies, relative to one another, in a fixed relationship; a power gas source; first and second conduit means for conducting power gas therefrom to said first and second chambers, respectively, to exert upward pressure on said power diaphragm assemblies; first and second sets of three piston rods each secured to the upper surfaces of said first and second assemblies, respectively; each of said sets of rods moving upward when its respective diaphragm assembly is raised;

thereby raising the adjacent plungers and sealing the adjacent portions of said sealing diaphragm against the lower surface of said first body, thereby closing off communication between certain of the adjacent external ports of said diverging channels in said first body, as desired; a carrier gas supply; a third conduit means for conducting carrier gas to one of said first set of spaced passages; a sample source; a fourth conduit means for conducting fluid sample to the second of said spaced passages, an external sample loop communicating between the third and fourth of said spaced passages, a fifth conduit means for venting said vaporized sample gas from the fifth of said spaced passages, and a sixth conduit means for conducting said carrier gas and said vaporized sample from the sixth of said spaced passages to a sorption column, said valve adapted to admit power gas to said first chamber, during a first interval of time, moving upward said first diaphragm assembly and its related pistons and plungers, whereby carrier gas enters said valve through said first spaced passage and exits through said fourth spaced passage while said sample fluid enters said valve, passes thru said sample loop, and is vented; said valve adapted to vent power gas from said first chamber, during a second interval of time; said valve adapted to admit power gas to said second chamber, during said second interval of time moving upward said second diaphragm assembly and its related pistons and plungers, whereby carrier gas enters said valve, passes thru said sample loop, driving before it a slug of sample fluid trapped therein, out of said valve while said sample fluid enters said second spaced passage and directly exits said third spaced passage.

6. A two-position, fluid-actuated diaphragm valve sampling system comprising, in combination: a first body provided with a set of first, second, third and fourth spaced passages, each of said spaced passages communicating between a region external of said first body and a separate juncture point intermediate the lower surface thereof, each of said passages there forking into two diverging passages communicating between said juncture points and said lower surface; so that said first spaced passage communicates with the first and second of said diverging passages, said second spaced passage communicates with the third and fourth of said diverging passages, said third spaced passage communicates with the fifth and sixth of said diverging passages, and said fourth spaced passage communicates with the seventh and eighth of said diverging passages; a first groove disposed in the lower surface of said first body to serve as an internal sample loop; a second groove in said lower surface bisected by one end of said first groove, said second groove having a length equal to the distance between adjacent pairs of the ports of said diverging passages; a third groove in said lower surface bisected by the other end of said first groove, said third groove having a length comparable to said second groove; said lower face further provided with a plurality of recesses located outside the circle described by the ports of said diverging passages adapted to receive therein a plurality of lugs affixed to adjacent second body, said second body spaced from said first body by a thin flexible sealing diaphragm of a diameter suited to fit within said lugs; a set of six cylindrical passages traversing said second body; a set of six plungers disposed in said first to sixth cylindrical passages, respectively, adjacent said diaphragm and opposite the ports of said diverging passages so that said first plunger is opposite the ports of said first of said diverging passages, and one end of said second passage, said second plunger is opposite the ports of said second and third of said diverging passages, said third plunger is opposite the port of said fourth diverging passage and one end of said third passage; said fourth plunger is opposite said fifth diverging passage and the other end of said third passage; said fifth plunger is opposite the ports of said sixth and seventh of said diverging passage, and said sixth plunger is opposite the eighth of said diverging passages and the other end of said second passage; first and second spaced chamber within third and fourth bodies, a third body disposed adjacent said second body, a first spaced chamber disposed in said third body and defined at its ends by first and second power diaphragm assemblies; a fourth body disposed adjacent said third body; a second chamber disposed in said fourth body and being defined at its upper end by said second power diaphragm assembly and at its lower end by the closed end of said fourth body; means to secure said first, second, third and fourth bodies, relative to one another, in a fixed relationship; a power gas source; a first and second conduit means for conducting power gas therefrom to said first and second chambers, respectively, to exert upward pressure on said power diaphragm assemblies; first and second sets of three piston rods each secured to the upper surfaces of said first and second assemblies, respectively; each of said sets of rods moving upward when its respective diaphragm assembly is raised, thereby raising the adjacent plungers and sealing the adjacent portions of said sealing diaphragm against the lower surface of said first body, thereby closing off communication between certain of the adjacent external ports of said diverging passages in said first body, as desired; a carrier gas supply; a third conduit means for conducting carrier gas to one of said first set of passages; a liquid sample source; a fourth conduit means for conducting liquid sample to the second of said spaced passages; a fifth conduit means for discharging said liquid sample from the third of said spaced passages; and a sixth conduit means for conducting said carrier gas and a slug of said liquid sample from the fourth of said spaced passages to a sorption column, said valve adapted to admit power gas to said first chamber, during a first interval of time, moving upward said first diaphragm assembly and its related pistons and plungers, whereby carrier gas enters said valve through said first spaced passage and exits through said fourth spaced passage while said sample fluid enters said valve, passes thru said sample loop, and is vented; said valve adapted to vent power gas from said first chamber, during a second interval of time; said valve adapted to admit power gas to said second chamber, during said second interval of time moving upward said second diaphragm assembly and its related pistons and plungers, whereby carrier gas enters said valve, passes thru said sample loop, driving before it a slug of sample fluid trapped therein, out of said valve while said sample fluid enters said second spaced passage and directly exits said third spaced passage.

7. A fluid-motor actuated valve system for distributing a first fluid to a selected conduit comprising, in combination: a first body having two opposite faces, first, second, and third spaced passages in said body, each of said spaced passages communicating between the first of said faces and a separate point intermediate the faces thereof, each of said spaced passages there forking into two diverging passages terminating in the second of said faces, so that first spaced passage communicates with the first and second of said diverging passages, said second spaced passage communicates with the third and fourth of said diverging passages, and said third spaced passage communicates with the fifth and sixth of said diverging passages; a second body having a third face spaced from the second face of said first body; a first flexible sealing diaphragm disposed within the area defined by said third face and thereby protected from compression; first and second cylindrical passages traversing said second body; first and second plungers slidably disposed in said first and second cylindrical passages, respectively; said first and second plungers adjacent said diaphragm and opposite the ports of said first, third, fourth and fifth of said diverging passages, respectively; a third body disposed adjacent said second body, respectively; a first spaced chamber disposed in said third body, said first chamber defined at its ends by first and second power diaphragm assemblies; a fourth body disposed adjacent said third body; a second spaced chamber disposed in said fourth body; said second chamber defined at its upper end by said second power diaphragm assembly and at its lower end by the closed end of said fourth body; means to secure said first, second, third and fourth bodies, relative to one another, in a fixed relationship; a first conduit means connected to supply said first fluid to be distributed under a first pressure to said second spaced passage; second conduit means connected to receive said first fluid from said first passage; third conduit means connected to receive said first fluid from said third passage; fourth means connected to supply, during a first interval of time, a second fluid under a second pressure greater than said first pressure to said first chamber to exert upward pressure on said first diaphragm assembly; first piston rod contacting on the upper side of said first assembly adapted to pass thru said first cylindrical passage pressuring said first plunger to force a first portion of said sealing diaphragm thereunder to seal between said ports of said third and second diverging passages of said first body, whereby first fluid enters said valve system thru said second passage and passes out of said system thru said third passage; fifth conduit means to vent said first chamber during a second time interval whereupon a first biasing means positioned in said first chamber will retract said first piston rod from sealing contact with said sealing diaphragm and permit said first fluid pressure to establish communication between said third and second diverging passages in said first body under said sealing diaphragm, a second biasing means positioned in said second chamber to normally bias said second diaphragm assembly and a second piston rod contacting on the upper side of said second assembly adapted to pass thru said first chamber, a vertical passage in said first diaphragm assembly, and said second cylindrical passage pressuring said second plunger upward to force a second portion of said sealing diaphragm thereunder to seal between the ports of said fourth and fifth diverging passages of said first body when said second fluid has been vented from said first chamber, said second fluid having a sufficient pressure while in said first chamber to overcome the upward bias of said second biasing means, whereupon said first biasing means may retract said second piston rod from sealing contact with said sealing diaphragm and permit said first fluid pressure to establish communication between the ports of said fourth and fifth diverging passages in said first body under said diaphragm.

8. A two-position fluid actuated, diaphragm sealed sampling valve, comprising, in combination: a first body provided with a set of six spaced passages, each of said spaced passages communicating between a region external of said first body and a separate point intermediate the lower surface thereof, each of said spaced passages there forking into two diverging passages communicating between said juncture points and said lower surface, so that said first spaced passage communicates with the first and second of said diverging passages, said second spaced passage communicates with the third and fourth of said diverging passages, said third spaced passage communicates with the fifth and sixth of said diverging passages, said fourth spaced passage communicates with the seventh and eigth of said diverging passages, said fifth spaced passage communicates with the ninth and tenth of said diverging passages, and said sixth spaced passage communicates with the eleventh and twelfth of said diverging passages; said lower surface further provided with a plurality of recesses located outside the circle described by the ports of said diverging passages adapted to receive therein a plurality of lugs affixed to an adjacent second body; said second body spaced from said first body by a flexible sealing diaphragm of a diameter suited to fit within said lugs; a set of six cylindrical passages traversing said second body adjacent said sealing diaphragm; a third body disposed adjacent said second body; first spaced chambers disposed within said third body; said first chamber defined at its ends by first and second power diaphragm assemblies; a fourth body disposed adjacent said third body; a second spaced chamber disposed in said fourth body and being defined at its upper end by said second power diaphragm assembly and at its lower end by the closed end of said fourth body; said third body having a first passage adapted to admit a power gas to said first chamber; means to secure said first, second, third and fourth bodies relative to one another in a fixed position; first and second sets of three piston rods each secured to the upper surfaces of said first and second power diaphragm assemblies, respectively; each of said sets of piston rods moving upward within its respective cylindrical passage when its respective diaphragm assembly is raised, thereby sealing the adjacent portions of said sealing diaphragm against the lower surface of said first body, thereby closing off communication between certain of the adjacent external ports of said diverging channels, as desired; a flat spring positioned in said first chamber having the internal lobes seated in grooves in the peripheries of said piston rods and normally biased downwardly, whereby said first set of piston rods is positively retracted when said first diaphragm assembly is lowered, thereby permitting establishment of communication between said certain adjacent external ports of said diverging channels; biasing means disposed within said second spaced chamber, normally biasing said second assembly upwardly; a first of said spaced passages adapted to receive a flowing carrier gas; a second of said spaced passages adapted to receive a flowing sample fluid; a sample loop external of said first body communicating between a third and fourth of said spaced passages; a fifth of said spaced passages adapted to vent said sample fluid; a sixth of said set for conducting carrier gas and sample fluid, as desired, from said sampling valve, said valve adapted to admit power gas to said first chamber, during a first interval of time, moving upward said first diaphragm assembly and its related pistons, whereby carrier gas enters said valve thru said first spaced passage and exits thru said fourth spaced passage, while said sample fluid enters said valve, passes thru said sample loop, and is vented; said valve adapted to vent power gas from said first chamber during a second interval of time, during which said biasing means raises said second assembly and related piston rods, whereby carrier gas enters said valve, passes thru said sample loop, driving before it a slug of sample fluid trapped therein, out of said valve, while said sample fluid enters said second spaced passage and directly exits via said third spaced passage.

9. A two-position, fluid-actuated, diaphragm-sealed sampling valve, comprising, in combination: a first body provided with first, second, third and fourth spaced passages, each of said spaced passages communicating between a region external of said first body and a separate juncture point intermediate the lower surface thereof, each of said spaced passages there forking into diverging passages communicating between said juncture points and said lower surfaces, so that said first spaced passage communicates with the first and second of said diverging passages, said second spaced passage communicates with the third and fourth of said diverging passages, said third spaced passage communicates with the fifth and sixth of said diverging passages, and said fourth spaced passage communicates with the seventh and eighth of said diverging passages; a first groove disposed in the lower surface of said first body to serve as an internal sample loop; a second groove in said lower surface bisected by one end of said first groove, said second groove having a length equal to the distance between adjacent pairs of the ports of said diverging passages; a third groove in said lower face bisected by the other end of said first groove, said third groove having a length comparable to said second groove; said lower face further provided with a plurality of recesses located outside the circle described by the ports of said diverging passages adapted to receive therein a plurality of lugs affixed to an adjacent second body; said second body spaced from said first body by a thin flexible sealing diaphragm of a diameter suited to fit within said lugs; a set of six cylindrical passages traversing said second body adjacent said diaphragm; a set of six plungers disposed in said first to sixth cylindrical passages, respectively, adjacent said diaphragm and opposite the ports of said diverging passages so that said first plunger is opposite the ports of said first of said diverging passages, and one end of said second passage, said second plunger is opposite the ports of said second and third of said diverging passages, said third plunger is opposite the port of said fourth diverging passage and one end of said third passage; said fourth plunger is opposite said fifth diverging passage and the other end of said third passage; said fifth plunger is opposite the ports of said sixth and seventh of said diverging passage, and said sixth plunger is opposite the eighth of said diverging passages and the other end of said second passage; a third body disposed adjacent said second body, a first spaced chamber within said third body, said first chamber defined at its ends by first and second power diaphragm assemblies; a fourth body disposed adjacent said third body; a second chamber disposed within said fourth body and being defined at its upper end by said second power diaphragm assembly and at its lower end by the closed end of said fourth body; said third body having a first passage adapted to admit a power gas to said first chamber; first and second sets of three piston rods each secured to the upper surfaces of said first and second power diaphragm assemblies, respectively; each of said sets of piston rods moving upward within its respective cylindrical passage when its respective diaphragm assembly is raised, thereby raising the adjacent plungers and sealing the adjacent portions of said sealing diaphragm against the lower surface of said first body, thereby closing off communication between certain of the adjacent external ports of said diverging channels, as desired; a flat spring positioned in said first chamber having the internal lobe thereof seated in grooves in the peripheries of said piston rods and normally biased downwardly, whereby said first set of rods is positively retracted when said first diaphragm assembly is lowered, thereby permitting establishment of communication between said certain adjacent external ports of said diverging channels; biasing means disposed within said second spaced chamber, normally biasing said second assembly upwardly; the first of said spaced passages adapted to receive a flowing carrier gas; the second of said spaced passages adapted to receive a flowing sample fluid; the third of said spaced passages adapted to vent said sample fluid; and the fourth of said spaced passages for conducting carrier gas and sample fluid, as desired from said sampling valve, said valve adapted to admit power gas to said first chamber, during a first interval of time, moving upward said first diaphragm assembly and its related pistons, whereby carrier gas enters said valve thru said first spaced passage and exits thru said fourth spaced passage, while said sample fluid enters said valve, passes thru said sample loop, and is vented; said valve adapted to vent power gas from said first chamber during a second interval of time, during which said biasing means raises said second assembly and related piston rods, whereby carrier gas enters said valve, passes thru said sample loop, driving before it a slug of sample fluid trapped therein, out of said valve, while said sample fluid enters said second spaced passage and directly exits via said third spaced passage.

References Cited in the file of this patent
UNITED STATES PATENTS

| | | |
|---|---|---|
| 2,964,938 | Fuller | Dec. 20, 1960 |
| 3,021,713 | Wright | Feb. 20, 1962 |

UNITED STATES PATENT OFFICE
CERTIFICATE OF CORRECTION

Patent No. 3,111,849 November 26, 1963

Arthur B. Broerman

It is hereby certified that error appears in the above numbered patent requiring correction and that the said Letters Patent should read as corrected below.

Column 8, line 75, before "fluid" insert -- first --; column 11, line 4, strike out "certain", second occurrence.

Signed and sealed this 2nd day of June 1964.

(SEAL)
Attest:

ERNEST W. SWIDER
Attesting Officer

EDWARD J. BRENNER
Commissioner of Patents